United States Patent [19]
Brown

[11] Patent Number: 6,123,860
[45] Date of Patent: Sep. 26, 2000

[54] METHOD FOR SEPARATING CELL POPULATIONS BY THERMOPHILIC CHARACTERISTICS

[76] Inventor: Thomas W. Brown, 1313 Hwy. G, Boyd, Wis. 54726

[21] Appl. No.: 09/346,863

[22] Filed: Jul. 2, 1999

Related U.S. Application Data

[63] Continuation-in-part of application No. 08/822,883, Mar. 24, 1997, abandoned.

[51] Int. Cl.[7] ............................. B01D 17/09; G01N 25/00
[52] U.S. Cl. .......................... 210/775; 210/175; 210/176; 210/183; 210/774; 435/173.1; 435/173.9
[58] Field of Search ..................................... 210/774, 775, 210/175, 176, 183, 244; 435/173.9, 173.1, 261

[56] References Cited

U.S. PATENT DOCUMENTS

Re. 32,350   2/1987   Bhattacharya .
4,911,806    3/1990   Hofmann .

*Primary Examiner*—John Kim
*Attorney, Agent, or Firm*—Kajane McManus

[57] ABSTRACT

The method for removing a thermophilic group of cells from a source of mixed cells, such as blood, comprises the steps of obtaining a sample, testing the sample to determine the temperature gradient required to cause migration of the thermophilic cells from the sample. In a preferred embodiment, the method includes the step of bringing the sample back to its ambient temperature quickly if it is desired to do so.

8 Claims, 1 Drawing Sheet

METHOD FOR SEPARATING CELL POPULATIONS BY THERMOPHILIC CHARACTERISTICS

CROSS REFERENCE TO RELATED APPLICATIONS

This is a continuation-in-part of U.S. application Ser. No. 08/822,883 filed Mar. 24, 1997, now abandoned.

BACKGROUND OF THE INVENTION

The present invention relates to a method for selectively causing separation of cell populations in a fluid, such as blood, based on thermophilic characteristics thereof and removing a predefined cell population from the fluid.

PRIOR ART

Cell populations have thermophilic characteristics which are cell type specific. Literature based on the art dealing with thermophilic characteristics of various cell types is replete with examples. It has been found through empirical testing that cell populations which have high proliferation rates, such as those of cancers, viruses, etc., tend to seek higher levels of warmth when compared to cells which are in their ambient environment, in this example, blood cells.

The thermophilic characteristics may be determined on an individual basis from the literature, so that a temperature gradient may be established at which such thermophilic cells will migrate toward a source of heat when a medium within which they are found, here blood, is cooled below its normal, ambient temperature.

SUMMARY OF THE INVENTION

There is provided a method for removing a predefined cell population from blood based on the thermophilic characteristic of the cell population, the method comprising the steps of: determining a temperature gradient at which the thermophilic cell population will migrate to a source of heat, cooling a sample of cells to a temperature below the determined gradient, placing a cell binding source of heat within the cooled sample, and removing the source of heat from within the sample to eliminate thermophilic cells bound thereto from the sample.

DESCRIPTION OF THE PREFERRED EMBODIMENT

Figure 1:
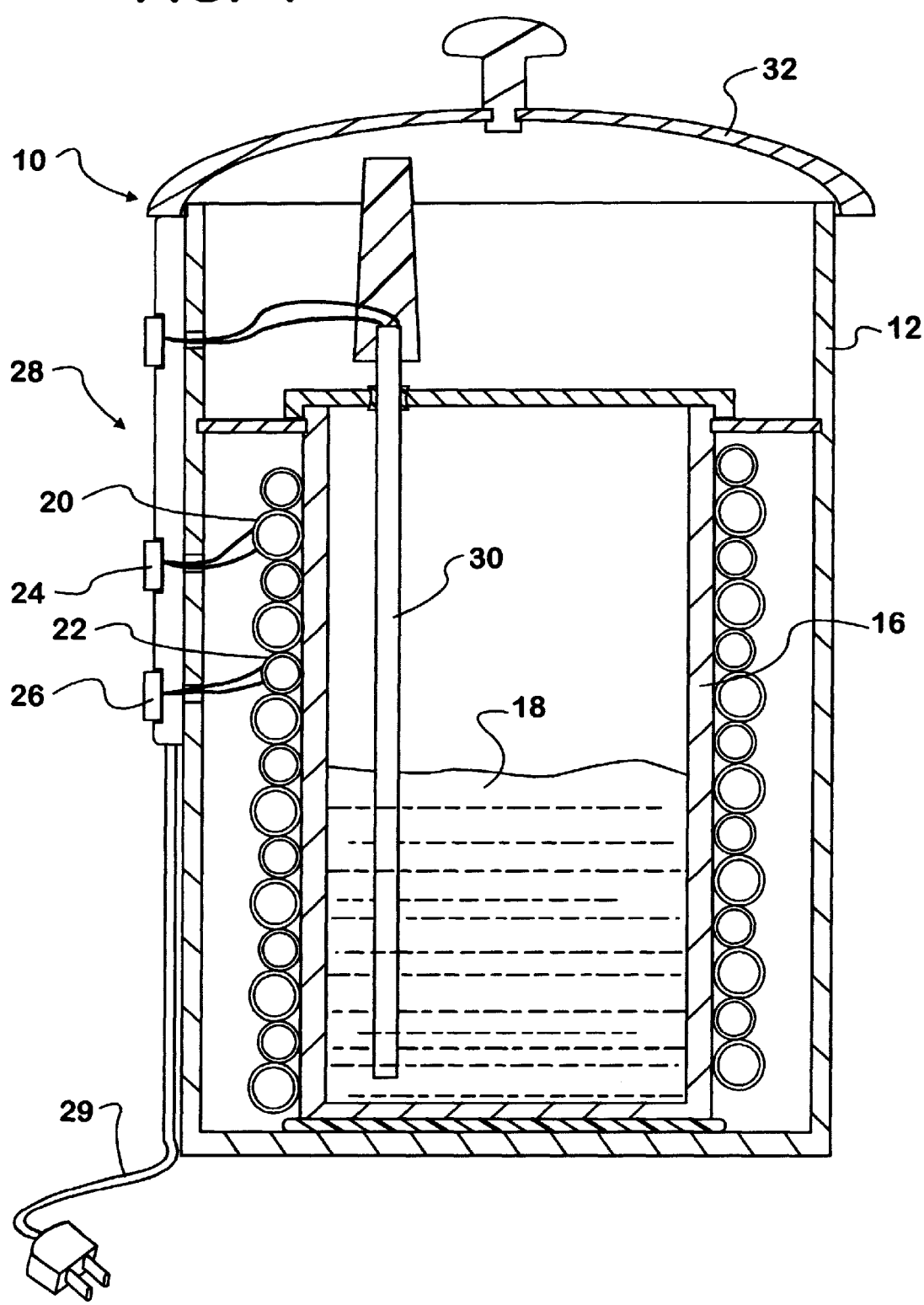
FIG. 1 is a perspective view of an exemplary apparatus for use in practicing the method of the present invention.

Referring now to the drawing in greater detail, there is illustrated in FIG. 1 an apparatus 10 made in accordance with the teachings of the present invention.

As shown, the apparatus 10 includes a stainless steel housing 12 having a container 16 therein within a sample 18 containing mixed cells, such as blood, may be received.

The container 16 is spaced inwardly of said housing 12 and a cooling mechanism 20 and a warming mechanism 22 which are independently operable are engaged about the container 16 within the housing 12, each in the form of a coil. Each coil 20 and 22 is electrically engaged to a respective activation switch 24 and 26 of a control panel 28 on the housing 12, and each activation switch 24 and 26 is further functionally engaged to a source of current, such as by a plug wire 29.

At least one stainless steel pin 30 is provided which is capable of being heated in any suitable manner and which is dimensioned to be introduced the container 16 without making contact with the container. The pin 30 may be manually introduced or may engage a top 32 configured to seat upon the apparatus 10 in known manner, with the pin 30 functionally engaging a power source and being electrically isolated from the top 32 and device 10.

Once the pin 30 is introduced into the sample 18 it is heated to a predetermined temperature while the container 16 is being cooled by the cooling coil 20, creating a desired temperature gradient across the sample 18, the gradient inducing the thermophilic cell population within the sample 18 to migrate to and onto the pin 30.

After predetermined period of time, the top 32 is removed, elimination the cell population bound to the pin 30 from the sample 18.

Cells clinging to the pin 30 are then removed, such as by washing or by other suitable process, and can be reintroduced into the sample 18 multiple times until no more cells are collected thereon.

When the pin 30 no longer collects cells thereon, the sample 18 may be heated to its ambient temperature through activation of the warming coil 22 prior to return of the sample 18 back into a patient's body, if desired.

Inasmuch as the method can be practiced with various apparatus easily recognized by those skilled in the art, the exemplary apparatus is described only simplistically herein and would require no undue experimentation to produce in more detailed form. Accordingly the description herein should not be construed as limiting.

In a preliminary trial, approximately 200 cc of blood were collected from a patient with metastatic breast cancer and placed in the container 16.

The sample was cooled to about 80–85° F. with the pin 30 being raised to a temperature about 90–93° F., and introduced for a period of around 7–10 seconds.

The pin 30 was found to have cancer cells bound thereto, but no blood cells were found attached upon microscopic examination of cells scraped from the pin 30.

It will be understood that the temperature gradient for cells of different types to separate is cell specific, as is the temperature of separation between cell populations.

The literature in this field would allow for use of the method in separation between cell types using the method described herein without undue experimentation and the example provided above is merely to provide a foundation from which to begin, but proving functionality of the proposed method.

As described above, the method of the present invention provide a number of advantages, some of which have been described above and others of which are inherent in the invention. Also, modifications may be proposed to the method without departing from the teachings herein. Accordingly, the scope of the invention is only to be limited as necessitated by the accompanying claims.

What is claimed is:

1. A method for removing a preselected thermophilic cell population from a fluid sample having a variety of cells therein, the method comprising the steps of:

determining a temperature gradient required for producing a migration of the preselected thermophilic cell population toward and onto a source of heat;

cooling the sample to a temperature below an ambient temperature of the sample;

introducing a source of heat comprising at least one stainless steel pin extending into the cooled sample, said pin being provided on a cover for a container for the sample wherein said cover includes circuitry therein for producing heating of the pin;

warming the source of heat to produce the determined temperature gradient to cause said thermophilic cells to migrate toward and bind thereto; and removing the source of heat with thermophilic cells clinging thereto from the sample after a predetermined time period.

2. The method of claim 1 wherein said container is provided with a cooling coil.

3. The method of claim 2 wherein said cooling coil is functionally engaged to a source of power.

4. The method of claim 3 further including the step of heating the sample back to an ambient temperature for the sample by turning off said cooling coil and turning on a warming device of the container.

5. The method of claim 2 wherein said container is made of stainless steel and wherein said cooling coil is electrically isolated from said container.

6. The method of claim 5 wherein said source of heat is electrically isolated from said container.

7. The method of claim 4 wherein the warming device is functionally engaged to a source of power.

8. The method of claim 7 wherein the warming device is electrically isolated from said container.

* * * * *